United States Patent [19]

Bennett, Jr. et al.

[11] 4,092,048

[45] May 30, 1978

[54] ROLL SUPPORTS WITH HYDROSTATIC AND ROLLER BEARINGS

[75] Inventors: Robert Gordon Bennett, Jr., Seymour; Richard Louis Bonnanzio, Stratford, both of Conn.

[73] Assignee: USM Corporation, Farmington, Conn.

[21] Appl. No.: 769,773

[22] Filed: Feb. 17, 1977

[51] Int. Cl.² ............................................. F16C 13/00
[52] U.S. Cl. ............................................. 308/9; 308/20; 308/35; 308/73; 308/122; 308/187; 308/207 R
[58] Field of Search ................ 308/9, 20, 35, 73, 122, 308/126, 127, 130, 187, 187.1, 202, 207, 214, 236, 237, DIG. 1, 243, 63, 65, 69, 70

[56] References Cited

U.S. PATENT DOCUMENTS

| | | | |
|---|---|---|---|
| 3,227,499 | 1/1966 | Whittum | 308/35 |
| 3,454,309 | 7/1969 | Ingham et al. | 308/35 |
| 3,679,272 | 7/1972 | Costa et al. | 308/9 |
| 3,973,810 | 8/1976 | Montag | 308/122 X |

Primary Examiner—Trygve M. Blix
Assistant Examiner—Douglas C. Butler
Attorney, Agent, or Firm—Donald N. Halgren; Richard B. Megley; Vincent A. White

[57] ABSTRACT

An apparatus for supporting the journal of a mill roll in a journal box carrying a bearing assembly in which the journal is disposed. The bearing assembly comprises a hydrostatic bearing interacting with a bearing sleeve which perform the dual function of retaining an arrangement of roller bearings during mill operation, and provide radial support for the roll during a resurfacing operation.

6 Claims, 3 Drawing Figures

4,092,048

ROLL SUPPORTS WITH HYDROSTATIC AND ROLLER BEARINGS

BACKGROUND OF THE INVENTION

1. Field of the Invention

This invention relates generally to an apparatus for journaling mill rolls, and more particularly, to an apparatus for supporting the journals of mill rolls for mounting in steel mills, paper mills, and the like, which can be used for supporting the mill rolls during roll grinding or resurfacing.

2. Prior Art

Rolls which are used in steel mills, paper mills, and other types of mills become worn and marked through use. When a roll is so worn and marked that it can no longer be used in production, it is standard procedure to transfer the roll to a roll grinder where it may be resurfaced. In the mill, each roll is normally supported by means of journals which are mounted in bearings in roll journal boxes. Since the bore of the journal box bearing may vary from 0.010 inch to 0.050 inch larger in diameter than the roll journal in order to provide clearance for hydraulic dynamic lubrication, it has not been feasible to regrind the rolls while they are supported by standard bearings alone in the journal boxes. Resurfacing with just these bearings would be unsatisfactory since the bearing clearances would permit a sufficient amount of play or lateral movement of the roll to permit regrinding within dimensional tolerances. This holds true even where the journals are supported in roller bearings since clearance is provided between the inner and outer races. Thus, it has been standard procedure to dismount the roll from its journal boxes and support it on special supports in the roll grinder which support the roll free from lateral play. However, dismounting the roll from its journal boxes is a time consuming and costly operation, making it desirable to provide a journal box having the required clearance for lubrication when the roll is mounted in the mill and which also provides for properly supporting the mill roll in a roll grinder without necessitating removal of the journal box. It is further desired to permit the stabilizing of the mill roll in chocks without mechanical adjustments or auxiliary equipment.

The present invention, has as one of its objects to be an advancement over the prior art, such as U.S. Pat. No. 3,227,499, assigned to the assignee of the present invention.

Another object of the invention is to provide a means where a mill roll is secure within a hydrostatic bearing clearance during a grinding or resurfacing operation, and then during a rolling operation, supported only by standard tapered roller bearings.

BRIEF SUMMARY OF THE INVENTION

The present invention provides a dual bearing arrangement for a mill roll. The mill roll is journaled in a chock assembly having a circumferential array of tapered roller bearings which support the roll during its normal operation, and a radially directed circumferentially disposed array of hydrostatic bearing pistons. When the mill roll is due for regrinding, the mill roll is resurfaced while being supported in its regular clock assembly. The hydrostatic bearing pistons are pressurized to be utilized to support the mill roll in a closer clearance as well as with a hydrostatic fluid film. In this manner normal bearing clearances will not hinder the resurfacing operation.

DESCRIPTION OF THE DRAWINGS

The objects and advantages of the present invention will become more apparent when viewed in conjunction with the following drawings in which.

DESCRIPTION OF THE PREFERRED EMBODIMENT

Figure 1:
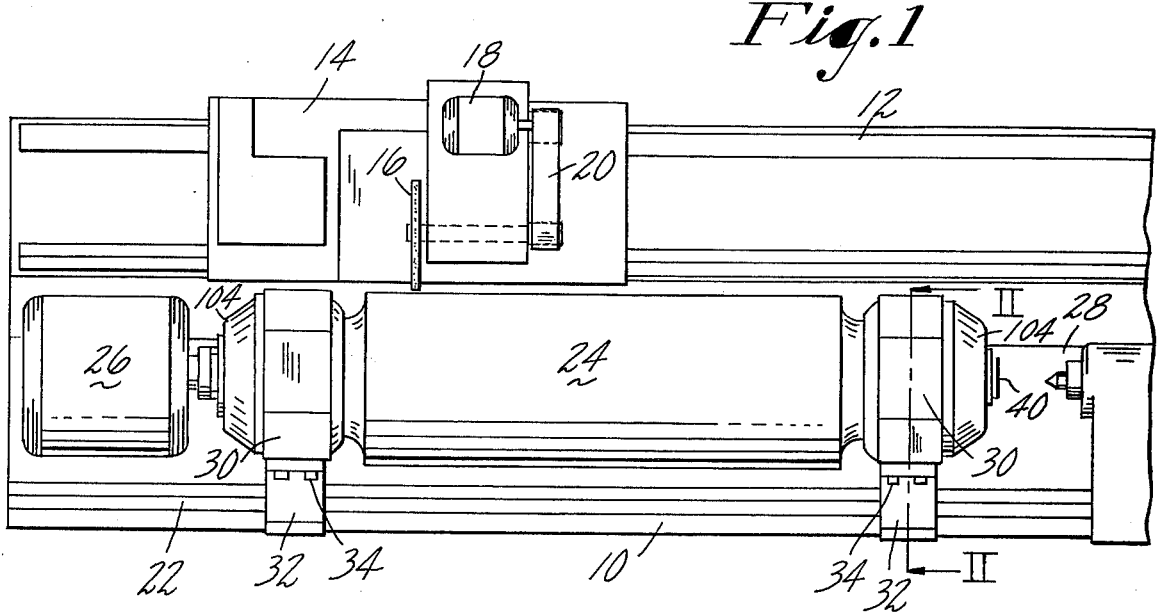
FIG. 1 is a plan view of a roll grinder having the roll to be reground mounted thereon, the roll being supported by a roll support arrangement constructed in accordance with the invention.

Referring now to the drawings, and particularly to FIG. 1, there is shown an roll grinder 10 provided with a set of ways 12 on which there is positioned a carriage 14 adopted to transverse the ways 12 in any well known manner. A grinding wheel 16 is mounted on the carriage 14, and is driven by a motor 18 through means such as a belt 20.

A bed 22 is provided parallel to the ways 12 for mounting for a roll 24 thereon. A motor 26 is mounted on the bed 22 for rotating the roll 24 when it is to be reground. A center 28 may be provided on the bed 22 for aligning the roll 24.

Figure 2:
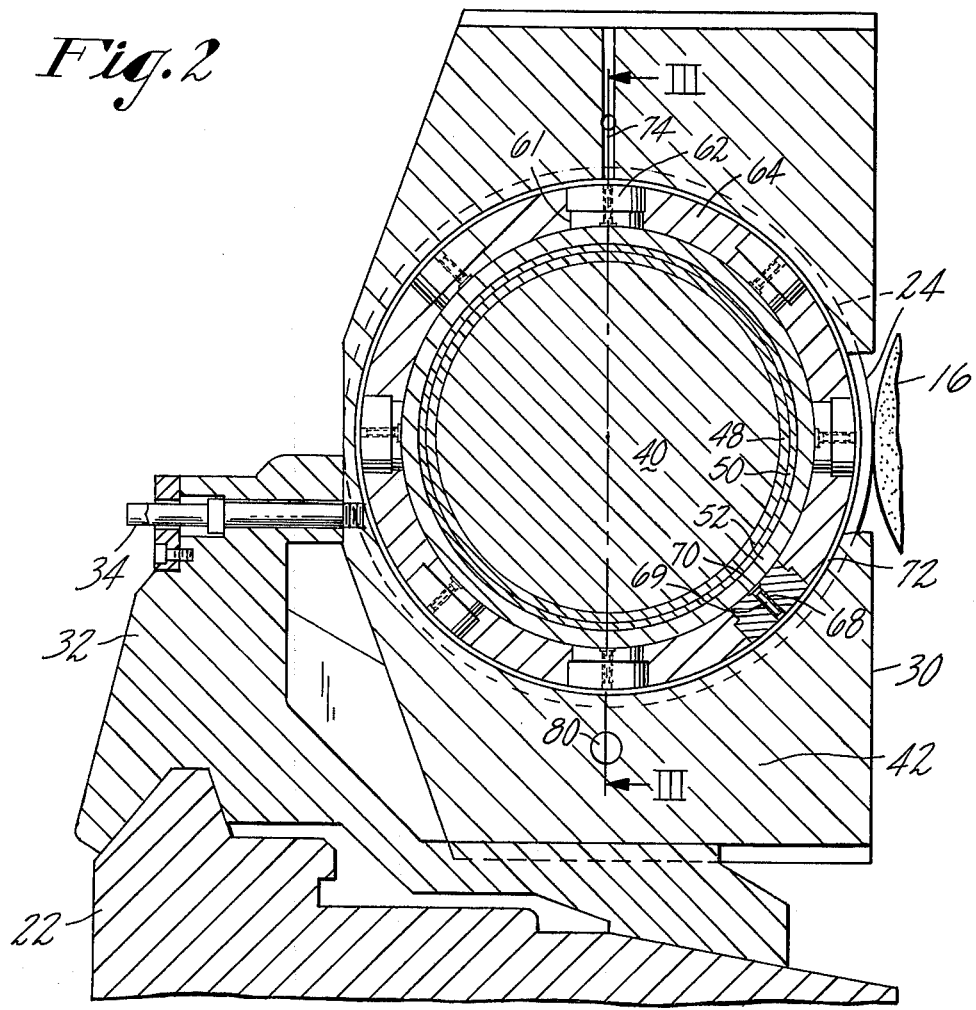
FIG. 2 is an enlarged section view taken along the lines II—II of FIG. 1, showing one of the two mountings of the roll journals.

During standard operation in a steel mill, paper mill, or the like, the roll 24 is mounted in the mill by means of a pair of journal boxes 30 at each end of the roll 24, the mill being provided with conventional support for the journal boxes 30. When it is necessary to regrind the surface of the roll 24, it is removed from the mill with the journal boxes 30 attached. Each journal box 30 is thereupon mounted on a support member 32, as shown in FIGS. 1 and 2. The support member 32 is supported on the bed 22. Due to the large mass of the roll 24 it is only necessary that the journal boxes 30 rest on the support member 32. Proper positioning may be effected by a screw 34 secured in the journal boxes 30 through the support member 32.

Figure 3:
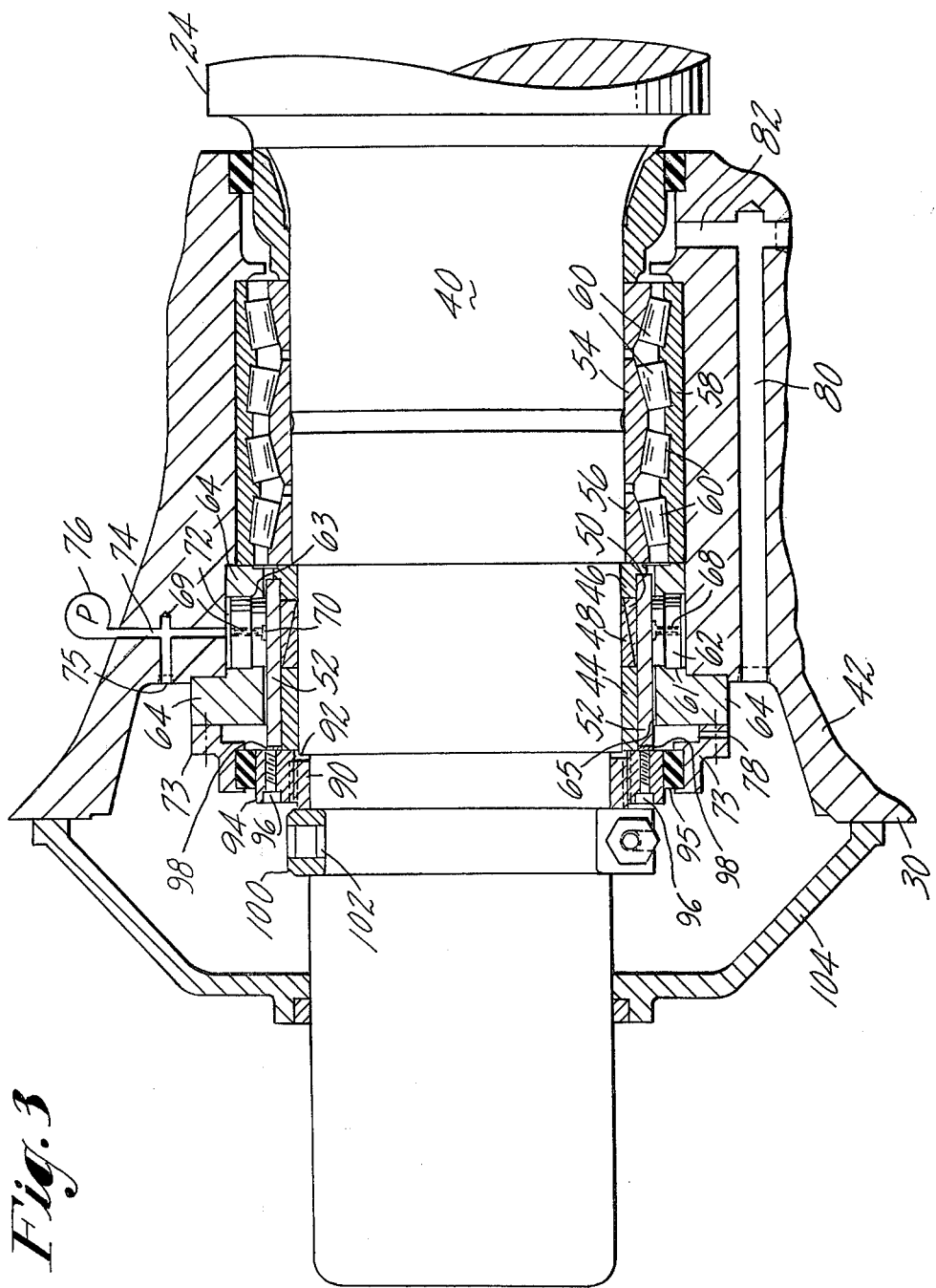
FIG. 3 is a sectional view taken along the lines III—III of FIG. 2.

Referring to FIGS. 2 and 3, the roll 24 is provided with a journal portion 40 at each end of the roll 24, only one end being shown. The journal portion 40 is supported at each end by the journal box 30. The journal box 30 comprises a frame member 42 having an opening therethrough. The journal 40 has a pair of annular locking element spacers, 44 and 46, disposed therearound. Also disposed about the journal portion 40, between the annular locking element spacers, 44 and 46, are a pair of annular slidingly engaged tapered locking elements, 48 and 50. Immediately outwards of the locking element spacers, 44 and 46, and the tapered locking elements, 48 and 50, is an annular bearing sleeve 52. Adjacent the longitudinally inner end nearest the center of the roll 24, that is, the inboard end, there is disposed an arrangement of tapered roller bearings 54, comprising an inner race 56, an outer race 58, and a plurality of annularly disposed tapered bearing rollers 60, relatively disposed therebetween.

A plurality of radially movable hydrostatic bearing pistons 62 are slidingly disposed, each in a bore 61 in an annular hydrostatic bearing housing 64. The annular hydrostatic bearing housing 64 is circumferentially disposed about the bearing sleeve 52. The hydrostatic bearing pistons 62, disposed within the housing 64, are of circular cross-section for economy of manufacture, though they may be of some other shape if a different bearing support area is desired. In the preferred embodiment, there are eight hydrostatic bearing pistons 62, each disposed in a bore 61 within the bearing housing 64. The piston 62 and the bore 61 each have a mating shoulder 63. Each hydrostatic bearing piston 62 has an axially disposed fluid channel 68 arranged therein. A restrictor 69 is contained within each channel 68. The radially inner end of each bearing piston 62 has a recessed bearing pocket 70 which permits the collection of pressurized fluid therein, and which seeps out against the rotating bearing sleeve 52. The radially inner surface of each bearing piston 62 is arcuately curved to provide a curvilinear mating generally frictionless lubricated surface with the bearing sleeve 52.

A circumferentially directed supply channel 72 is disposed in the radially outer surface of the bearing housing 64, providing fluid communication between the radially outermost portions of adjacent bores 61 and a pressurized fluid supply channel 74, which is disposed in the frame member 42 providing pressurized fluid communication from a pressurized fluid source 76, to the circumferential supply channel 72 in the bearing housing 64.

Longitudinally adjacent the outboard end of the bearing housing 64 is an end cap 73, secured to the bearing housing 64 by a circumferential array of bolts, not shown. An arrangement of fluid drain channels, 78, 80 and 82, are disposed in the lower portions of the end cap, and in the frame member 42.

A nut engagement ring 90 is disposed about the journal portion 40, adjacent a shoulder 92 thereon. The outer periphery of the engagement ring 90 is threaded to matingly receive a lock nut 94, which is threaded on its internal circumference. A ring seal 95 is disposed between the outside of the lock nut 94 and the inner circumference of the end cap 73. An annular array of adjusting bolts 96 extend longitudinally through the lock nut 94 and abut an annular ring or shim 98. The shim 98 is disposed between the lock nut 94 (and the adjusting bolts 96), and the annular bearing sleeve 52. The bolt held shim 98 restrains the bearing sleeve 52 from any axial motion. A half-ring 100 is disposed in a channel 102 cut circumferentially into the journal portion 40 immediately adjacent the outer planar edge of engagement ring 90. The journal box 30 has a protective cover 104 about the journal portion 40 enclosing the bearing assembly.

The engagement of the grinding wheel 16, during a resurfacing operation with the surface of the roll 24, is shown in FIGS. 1 and 2. The mill clearance between the sleeve 52 about the journal portion 40, and the bearing housing 64, is shown in FIG. 3 at 65. It may be seen that pressure of the grinding wheel 16 against the surface of the roll 24 could easily cause lateral displacement of the roll 24 with respect to the journal boxes 30, because the bore in the journal bearing may be larger than the journal and because of the clearances within the roller bearing arrangement itself, each necessary to permit lubrication or because of engineering tolerances. To overcome this, the frame member 42 contains the plurality of hydrostatic pistons 62, eight in the preferred embodiment to support the journal 40. Additionally, the housing 64 also contains the standard roller bearings 54.

To initiate functioning of the bearing pistons 62, pressurized fluid, in this case oil, is introduced into the fluid supply channel 74 from the pressurized fluid source 76, which may comprise a pump or the like, or from a quick disconnect fitting attached at an orifice marked 75, as shown in FIG. 3. The pressurized fluid enters the circumferentially directed supply channel 72 in the bearing housing 64, and is distributed to the radially outer ends of the bores 61. The fluid is caused to enter the fluid channels 68 within each bearing piston 62. The pressurized fluid flow is then proportioned through the restrictors 69 within the fluid channels 68, and caused to flow into each recessed bearing pocket 70 in the radially inner end of each bearing piston 62. There is a pressure drop in the fluid, between the circumferentially directed supply channel 72 and the recessed bearing pockets 70, due to the fluid resistance of the restrictors 69. The pressure in each individual bearing pocket 70 varies as a function of the loading requirements. The pressure causes the bearing pistons 62 to be forced radially inwards to support the journal 40. The pressurized oil then flows from each pocket 70 generally outwards to lubricate the area between the sleeve 52 and the piston 62 then passing to catch areas, wherein the fluid pressure decays to generally atmospheric pressure. The drain oil then collects at the bottom of both ends of the bearing, the path on the inboard end being through the main roller bearings 54, to the fluid channels 80 and 82, to be recycled in the pressurized fluid system.

The radially inner surfaces of the bearing pistons 62 act hydrostatically against the outer surface of the annular bearing sleeve 52. The tapered locking elements, 48 and 50, provide support between the journal 40 and the inner surface of the bearing sleeve 52. This establishes positive contact between the two members to assure radial stiffness. These elements are not self-locking and can be easily disassembled for bearing inspection if required. The tapered elements, 48 and 50, can also be utilized to expand against the bearing sleeve 52, to permit clearance control if it is required, by adjustment of the locking nut 94, so they may be moved tighter with respect to one another. The shims 98 on the outboard end of the bearing sleeve 52 transfer any lateral or thrust forces of the roll 24 through the sleeve 52 to the lock nut 94 and its associated engagement ring 90, to avoid transmitting any thrust forces from being carried through the tapered locking elements, 48 and 50.

The pressure provided to the bearing pistons 62 in this embodiment in 1650 psi, which is ample for supporting a roll weight of 5,000 pounds; permitting satisfactory clearance during support and preloading of the roll 24. As an external load is applied, 5,000 pounds downward in this case, the clearance 65, will decrease and the bottom piston 62 will initially be caused to be pressed slightly into its respective bore 61, which will result in less fluid flow and a higher recess pressure therein. Conversely, the uppermost piston 62 will have a clearance that will increase yielding more fluid flow and a decreased pocket 70 pressure. Collectively, the vertical force components of the pistons 62, eight in this embodiment, are summed to balance the weight of the roll 24, and support the roll 24 with a clearance of several thousandths of an inch.

When the grinding of the surface of the roll 24 is complete, the fluid pumping system is shut down, which causes the bearing pistons 62 to retract radially outwards in their respective bores 61, permitting the roll 24 to be supported on its main roller bearings 54, the entire assembly ready to be transferred to the mill where it is to be reused.

The present invention therefor, shows an arrangement for stabilizing cold mill work rolls in chocks without the necessity for routine mechanical adjustments to the chocks or auxiliary equipment, the roll being provided viscous damping as well, during grinding on the hydrostatic oil film.

Having thus described our invention, what we claim as new and desire to secure by Letters Patent of the United States is:

1. A journal box for supporting a roll journal, said journal box comprising:
    a frame;
    a first bearing mounted in said frame for supporting a roll member during rotation therein;
    a second bearing arrangement mounted in said frame for concise radial support of said roll member during rotation therein;
    said second bearing arrangement comprising a plurality of hydrostatic pistons radially movably disposed in a housing disposed in said frame; said hydrostatic pistons activatable upon requirement for close tolerance work with respect to said roll member; and
    securing means connected between said housing and said roll journal to retain said first bearing and said second bearing arrangements within said frame, said securing means comprising; a nut engagement ring threaded on its outer periphery, and disposed outwardly of the outboard edge of said second bearing arrangement; a lock nut threaded about said nut engagement ring; and an end cap annularly disposed between said lock nut and said housing.

2. A journal box for supporting a roll journal as recited in claim 1 wherein said second bearing arrangement also includes:
    an annular bearing sleeve disposed radially within said housing and the inner end of said hydrostatic pistons:
    a pair of annularly arranged locking elements circumferentially disposed between said bearing sleeve and said roll journal;
    a pair of spacers disposed axially adjacent said locking elements, the outboard side of one of said spacers being disposed adjacent said lock nut, the inboard side of other spacer being disposed adjacent said first bearing.

3. A journal box for supporting a roll journal as recited in claim 2 wherein said housing in said second bearing arrangement has an annularly disposed channel about its outer periphery for delivery of pressurized fluid from a pressured fluid source to the radially outer end of said hydrostatic pistons.

4. A journal box for supporting a roll journal as recited in claim 3 wherein each of said hydrostatic pistons has an axially disposed fluid channel disposed therethrough, and a fluid restrictor is disposed in said axially disposed fluid channel in each said hydrostatic piston to permit a pressurized response in said hydrostatic pistons.

5. A journal box for supporting a roll journal as recited in claim 3 wherein each said piston has a recessed pocket on its radially inner end to receive pressurized fluid and to permit said fluid to lubricate the surface of said sleeve and the radially inner end of each said piston by pressurized seepage therebetween.

6. A journal box for supporting a roll journal as recited in claim 2 wherein said pair of axially tapered and locking elements are in sliding relationship with one another, between said roll journal and said bearing sleeve, to provide clearance control and to expand said bearing sleeve.

* * * * *